United States Patent
Pau

(10) Patent No.: US 12,018,943 B2
(45) Date of Patent: Jun. 25, 2024

(54) OPTICAL GYROSCOPE WITH GAIN MEDIUM AND CIRCULATING LIGHT

(71) Applicant: Arizona Board of Regents on Behalf of the University of Arizona, Tucson, AZ (US)

(72) Inventor: Stanley Pau, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 330 days.

(21) Appl. No.: 17/604,726

(22) PCT Filed: Apr. 22, 2020

(86) PCT No.: PCT/US2020/029348
§ 371 (c)(1),
(2) Date: Oct. 18, 2021

(87) PCT Pub. No.: WO2020/219564
PCT Pub. Date: Oct. 29, 2020

(65) Prior Publication Data
US 2022/0205785 A1    Jun. 30, 2022

Related U.S. Application Data

(60) Provisional application No. 62/837,636, filed on Apr. 23, 2019.

(51) Int. Cl.
*G01C 19/58* (2006.01)
*H01S 3/06* (2006.01)
*H01S 3/094* (2006.01)

(52) U.S. Cl.
CPC ............ *G01C 19/58* (2013.01); *H01S 3/0602* (2013.01); *H01S 3/094053* (2013.01)

(58) Field of Classification Search
CPC ....................................................... G01C 19/58
See application file for complete search history.

(56) References Cited

U.S. PATENT DOCUMENTS 4,829,537 A * 5/1989 Baer ...................... G01C 19/64
372/66
5,444,533 A    8/1995 Nishiura et al.
(Continued)

FOREIGN PATENT DOCUMENTS

CN    108871307 A    11/2018
EP      0270346 A1     6/1988
(Continued)

OTHER PUBLICATIONS

Yong-Seok Choi, Hee-Jong Moon and Kyungwon An, "Ultrahigh-Q microsphere laser based on the evanescent-wave-coupled gain," Technical Digest. CLEO/Pacific Rim 2001. 4th Pacific Rim Conference on Lasers and Electro-Optics (Cat. No.01TH8557), Chiba, Japan, 2001, pp. II-II, doi: 10.1109/CLEOPR.2001.971017. (Year: 2001).*

(Continued)

*Primary Examiner* — Hina F Ayub
(74) *Attorney, Agent, or Firm* — Perkins Coie LLP

(57) ABSTRACT

Devices and associated methods for measuring orientation using an optical gyroscope are disclosed. One example optical gyroscope includes a spherical component configured to allow propagation of light in one or more confined modes inside the spherical component. The spherical component includes a gain medium for enhancing a sustained confinement of light within the spherical component. The optical gyroscope also includes one or more detectors positioned outside of the spherical component to detect at least one characteristic of the light, or a change thereto, in response to a rotation of the optical gyroscope.

27 Claims, 8 Drawing Sheets

(56) References Cited

U.S. PATENT DOCUMENTS

| | | |
|---|---|---|
| 6,628,897 B2 | 9/2003 | Suzuki |
| 8,442,088 B1 | 5/2013 | Ilchenko et al. |
| 8,514,400 B2 | 8/2013 | Mohageg et al. |
| 2005/0163185 A1* | 7/2005 | Vahala ............... G02B 6/29341 372/67 |
| 2009/0091763 A1 | 4/2009 | Park et al. |

FOREIGN PATENT DOCUMENTS

| | | |
|---|---|---|
| GB | 1042312 A | 9/1966 |
| JP | 2010164504 A | 7/2010 |
| JP | 2010230476 A | 10/2010 |

OTHER PUBLICATIONS

Cai, M., et al., "Fiber-coupled microsphere laser," Optics Letters vol. 25, No. 19, pp. 1430-1432, Oct. 2000.

Ceppe, Jean-Baptiste, et al., "Dynamical analysis of modal coupling in rare-earth whispering gallery mode micro-lasers," Institut de Recherche de Chimie de Paris, Mar. 2019.

Elliott, Gregor R., et al., "Chalcogenide glass microsphere laser," Optics Express Vo. 18, No. 25, pp. 26720-26727, 2010.

Foreman, Matthew R., "Whispering gallery mode sensors," Advances in Optics and Photonics 7, 168-240 (2015).

Gorodetsky, M. L., et al, "Optical microsphere resonators: optimal coupling to high-Q whispering-gallery modes," J. Optical Society of America vol. 16, No. 1, pp. 147-154 (1999).

International Search Report & Written Opinion dated Jul. 21, 2020 for International Patent Application No. PCT/US2020/029348 (13 pages).

Jiang, Xuefeng, et al., "Whispering galley microsensors: a review," Washington University, Apr. 2018.

Lawrence, A., "The Dynamically Tuned Gyroscope," Modern Inertial Technology, Chapter 9, Springer Science, 1998.

Liang, Wei, et al., "Whispering Gallery Mode Optical Gyroscope," IEEE, 2016.

Passaro, Vittorio M. N., et al., "Gyroscope Technology and Applications: A Review in the Industrial Perspective," Sensors 17, 2284, 2017.

\* cited by examiner

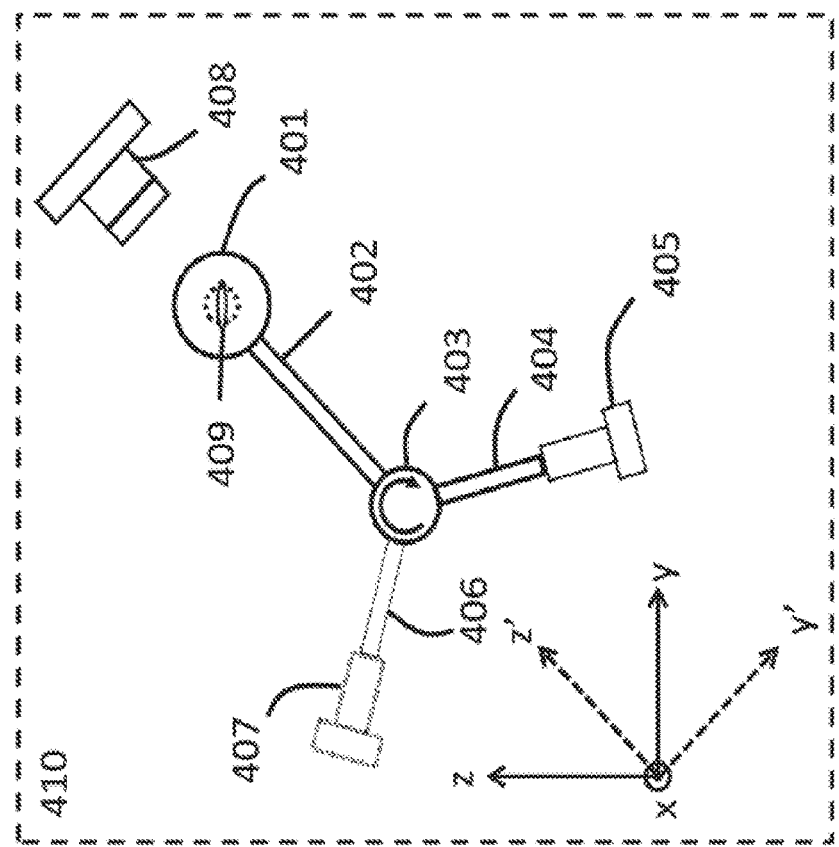
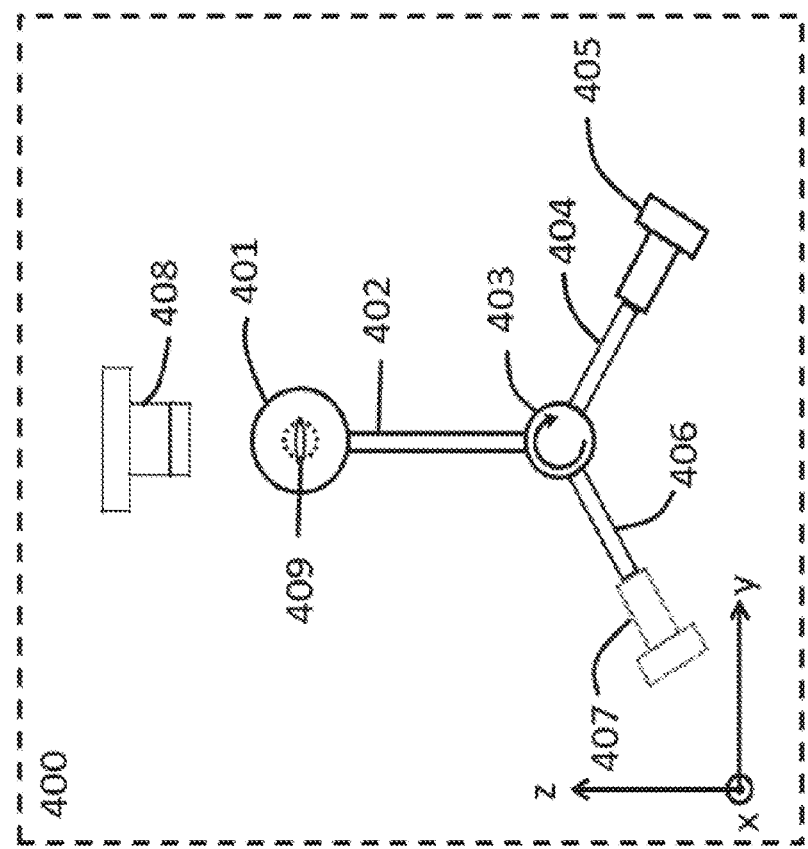
FIG. 4(a)
FIG. 4(b)

Rotate the optical gyroscope from a first position to a second position, the optical gyroscope comprising a spherical component configured to allow propagation of light in one or more confined modes inside the spherical component, the spherical component comprising a gain medium for enhancing a sustained confinement of light within the spherical component, and the optical gyroscope also including one or more detectors positioned outside of the spherical component
802

Determine at least one characteristic of the light that is captured by the one or more detectors in response to the rotation of the gyroscope
804

Determine an amount of rotation of the gyroscope based on the determined characteristic
806

FIG. 8

OPTICAL GYROSCOPE WITH GAIN MEDIUM AND CIRCULATING LIGHT

CROSS-REFERENCE TO RELATED APPLICATION(S)

This patent document is a 371 National Phase Application of International Patent Application PCT/US2020/029348, filed Apr. 22, 2020, which claims priority to the provisional application with Ser. No. 62/837,636, titled "Optical Gyroscope with Gain Medium and Circulating Light," filed Apr. 23, 2019. The entire contents of the above noted applications are incorporated by reference as part of the disclosure of this document for all purposes

TECHNICAL FIELD

The disclosed technology relates to gyroscopes, and devices and methods for determining an orientation of a device or object.

BACKGROUND

Gyroscopes can be used for determining orientation and angular velocity and have many applications in vehicles, air and spacecraft, drones, wearable and handheld electronic devices. In mechanical, dynamically-tuned and rate-integrating gyroscopes, a spinning mass, such as a wheel or disc, has an angular momentum and direction of spin. This direction is fixed in space due to conservation of angular momentum and serves as a reference. Measurement of any deviation from the reference provides information of any rotation and motion of the object. Examples of conventional gyroscope technology include mechanical gyroscopes, ring laser gyroscopes (RLGs), interferometric fiber-optic gyroscopes (IFOGs), quartz, dynamically tuned gyroscopes, rate integrating gyroscopes, micro-electro-mechanical systems (MEMS) gyroscopes and others. There is, however, still a need to develop improved gyroscopes that are fast, accurate, durable, insensitive to noise and environmental changes, and can be implemented with low cost, small size and low power consumption.

SUMMARY

The disclosed embodiments relate to optical gyroscopes and associated methods for measuring orientation that are achieved in-part by measurements of the mode distribution and polarization state of circulating light inside a gain medium. One example optical gyroscope includes a spherical component configured to allow propagation of light in one or more confined modes inside the spherical component. The spherical component includes a gain medium for enhancing a sustained confinement of light within the spherical component. The optical gyroscope also includes one or more detectors positioned outside of the spherical component to detect at least one characteristic of the light, or a change thereto, in response to a rotation of the optical gyroscope.

BRIEF DESCRIPTION OF THE DRAWINGS

FIG. 4(a) illustrates an optical gyroscope in accordance with another example embodiment.

FIG. 4(b) illustrates a rotated configuration of the optical gyroscope of FIG. 4(a).

FIG. 8 illustrates a set of operations that can be carried out to determine an orientation value using an optical gyroscope in accordance with an example embodiment.

DETAILED DESCRIPTION

Figure 1:
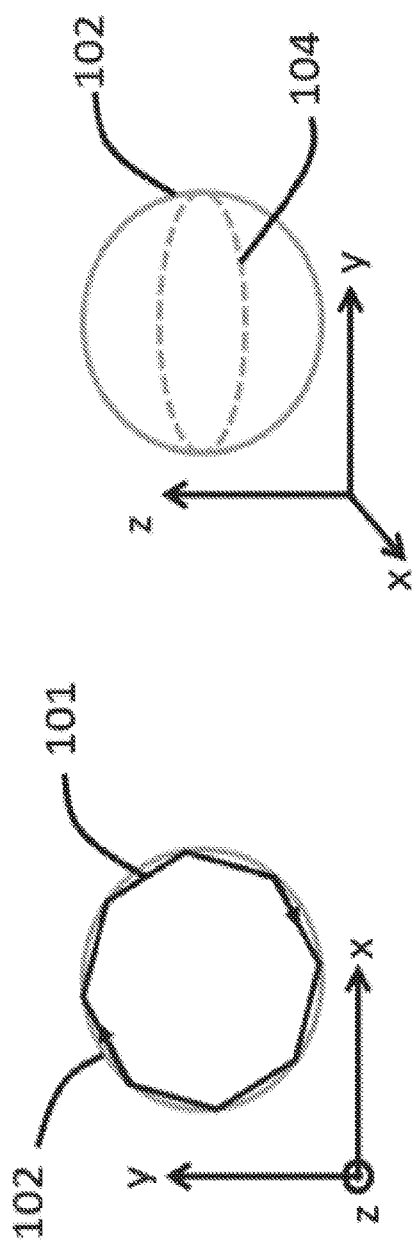
FIG. 1 illustrates different views of a spherical optical cavity and a whispering gallery mode.

Some traditional gyroscopes including ring laser gyroscopes (RLGs) and interferometric fiber-optic gyroscopes (IFOGs) operate based on the Sagnac effect, which involves the measurement of the difference in propagation time between two counter-propagating light beams traveling in opposite directions. In stationary condition, the two counter-propagating light beams take the same time to travel in either direction. Under rotating condition, the relative phases of the two beams, i.e., the position of the interference fringe, are shifted depending on the angular velocity of the apparatus. Some examples of such optical gyroscope that operate based on the Sagnac effect are described in U.S. Pat. Nos. 8,442,088 and 8,514,400, which are incorporated by reference herein. Quartz and MEMS gyroscopes are vibrating structure gyroscopes, which use a vibrating structure to determine the rate of rotation. A vibrating object moves in the same plane that is independent of the motion and orientation of the support. Under rotating condition, a force is exerted on the vibrating object by the support due to the Coriolis effect. Measurement of the force provides information of the rate of rotation of the support.

In the description that follows, subheadings are used to provide a proper flow for understanding of the disclosed embodiments. It should be understood, however, that the various features of the disclosed embodiments are described throughout this patent document and their description is not limited to what is provided under a specific subheading

Light Polarization and Direction

Polarization is a property of light that describes the direction of the electromagnetic wave that is perpendicular to the direction of motion of the wave. The different polarization states are linear, elliptical and circular polarizations. For linear polarization, the electric field of light oscillates in a fixed direction. For elliptical and circular polarization, the electric field rotates and traces out an ellipse and a circle, respectively, as the light propagates. The electric field can rotate clockwise (or counterclockwise) as it propagates, and the resulting light is called left-handed (or right-handed) polarized. The polarization state of light is conserved when it propagates in a vacuum. The polarization state can change by absorption, reflection and refraction of light. The polarization state can be described by the four Stokes parameters.

The direction of linear polarized light and the plane of elliptical and circular polarized light can serve as a reference in a gyroscope. In order to utilize this property of light as a gyroscope, the light needs to be confined in space and inside a gain medium. The measurement of the state of light is generally destructive, i.e., the light is absorbed, converted to photoelectrons and detected as current, and the gain medium is necessary to amplify existing reference light such that the amount of confined light does not go to zero. The purpose of the gain medium is to continuously generate and amplify light of the same state, in this case light of same polarization and mode.

Spherically Symmetric Optical Cavity and Detection of Light Distribution and Polarization The operating principle of the optical gyroscope involves the generation of light in a pre-determined polarization state and mode in a confined medium. The confined medium can be a spherically symmetric optical cavity with an isotropic gain medium inside, and the light is propagating as a mode inside the optical cavity. Unlike conventional optical gyroscope based on the Sagnac effect which uses two counter propagating modes, this configuration utilizes only one propagating mode, i.e., uni-directional. Ideally, only a single mode is propagating inside the cavity, but in practice multi-mode propagation is permitted, provided that one can distinguish the different modes by spatial distribution, wavelength and/or polarization measurement. The optical loss for the mode includes scattering, absorption, and material loss and should be minimized to maintain a finite amount of light inside the cavity during operation of the gyroscope. Light is constantly leaking outside the cavity, and the distribution and polarization state of this light can be measured by a single detector or by multiple fast detectors or cameras to determine the reference direction. Relative rotation and motion can be calculated from deviation from the reference direction.

In one embodiment of the optical gyroscope, a glass sphere is utilized as the confined medium. The glass sphere has a smooth surface with low optical scattering and is doped uniformly with material, such as erbium or ytterbium, which serves as a gain medium for the propagating light. Other example material for confinement/gain may include neodymium-doped gallium lanthanum sulfide glass.

FIG. 1 illustrates a spherical optical cavity and a whispering gallery mode as viewed from the top (left hand side) and side (right hand side). Whispering gallery modes are specific resonances of light waves inside a given resonator or cavity with smooth edges. They correspond to waves circling around the cavity as they undergo continuous total internal reflection off the cavity surface, while meeting the resonance condition, i.e., after one roundtrip, the circulating light returns to the same point with the initial phase (or multiples thereof), thus constructively interfering with itself. In particular, in the configuration of FIG. 1, a glass sphere 102 is depicted where light propagates inside the sphere 102 as whispering gallery modes. The mode can be visualized as light rays 101 bouncing along the equator 104 of the sphere 102 by total internal refraction. The mode can be excited by an external waveguide.

Figure 2:
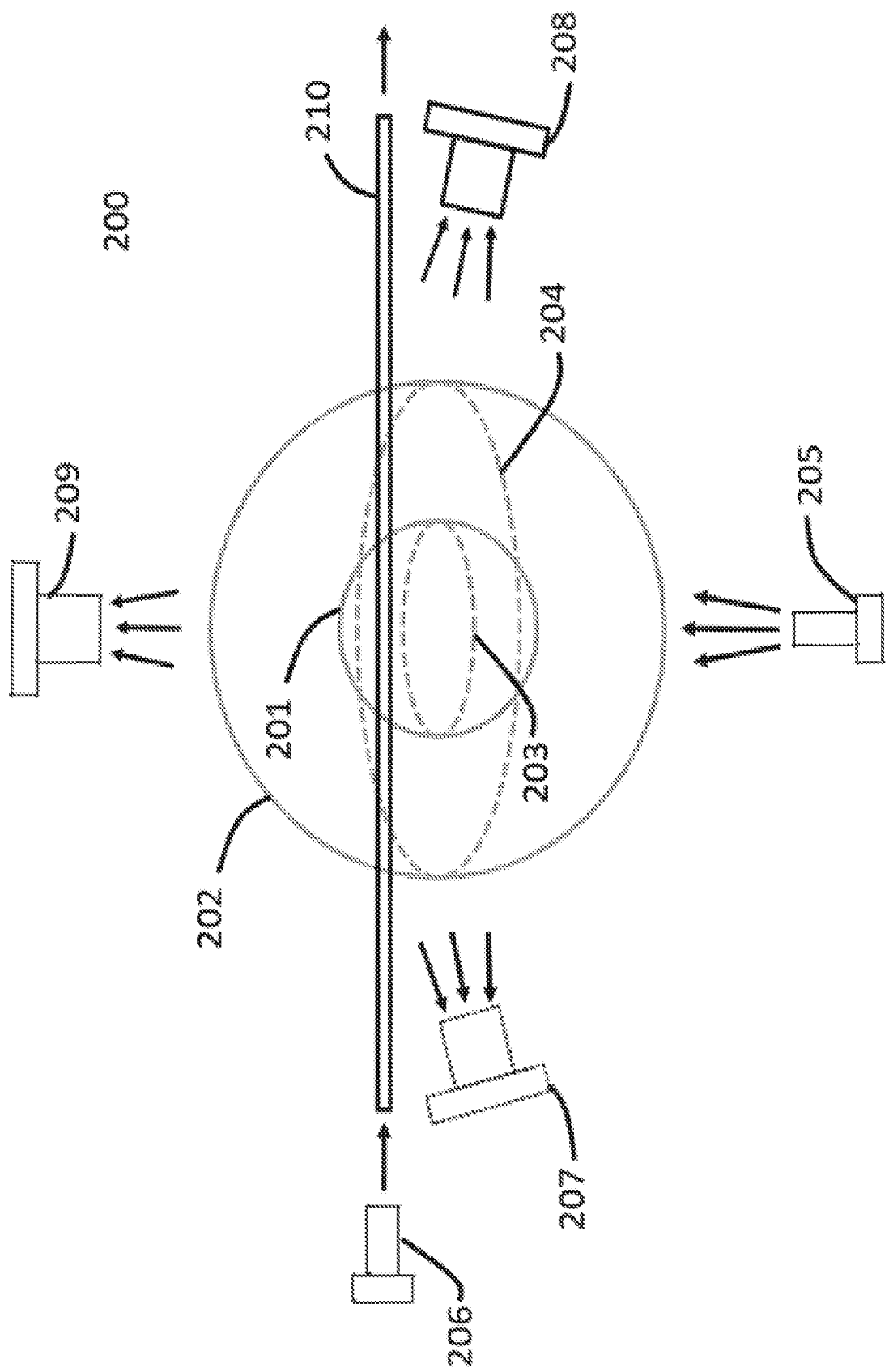
FIG. 2 illustrates an optical gyroscope that includes a multi-layer spherical optical cavity, excitation sources and detectors in accordance with an example embodiment.

FIG. 2 shows one configuration of the optical gyroscope that includes a multi-layer spherical optical cavity, excitation sources and detectors in accordance with an example embodiment. The glass sphere 201 that includes a gain medium is surrounded by a cladding sphere 202 of lower refractive index which is connected to supporting structures (not shown). Light propagates around the sphere in one direction and is amplified along the equator 203 of the gain medium. The evanescent mode of the light propagates along the equator 204 of the cladding sphere 202. A light source 205 is used to excite the gain medium (e.g., erbium or ytterbium) inside the glass sphere 201. Another light source 206 (e.g., a laser) is coupled to a waveguide 210, and this light creates the initial propagating mode inside the optical cavity. In one example configuration, the waveguide 210 delivers the light to the cladding sphere 202; for example, evanescent waves can leak into the cladding sphere 202 that subsequently reach the gain medium of the glass sphere 201. The source 206 is turned off after the propagating mode reaches steady state. For some embodiments, this initialization may not be necessary since the propagating mode can, in principle, be started from noise. Some of the light from the evanescent mode leaks out of the sphere and is collected by fast detectors 207, 208 and 209. The detectors can be wavelength- and polarization-sensitive and can be array detectors. As the entire instrument rotates, the light distribution inside the sphere is expected to be stationary. Measurement of the light distribution and/or polarization relative to the instrument coordinates can provide information of the relative rotation and motion of the instruments.

While the configuration of FIG. 2 shows three detectors 207, 208 and 209, in some configurations, only one detector can be used. In general, having multiple detectors can improve the accuracy and/or speed of detections. The detectors based on different technologies and capabilities can be used; these include, but are not limited to, cameras, polarization-sensitive detectors, wavelength-sensitive detectors, point detectors and the like. Moreover, while FIG. 2 shows a cladding with a spherical geometry, claddings with other geometries such as a rectangular, a triangular, or an arbitrary-shaped geometry can be used.

Figure 3:
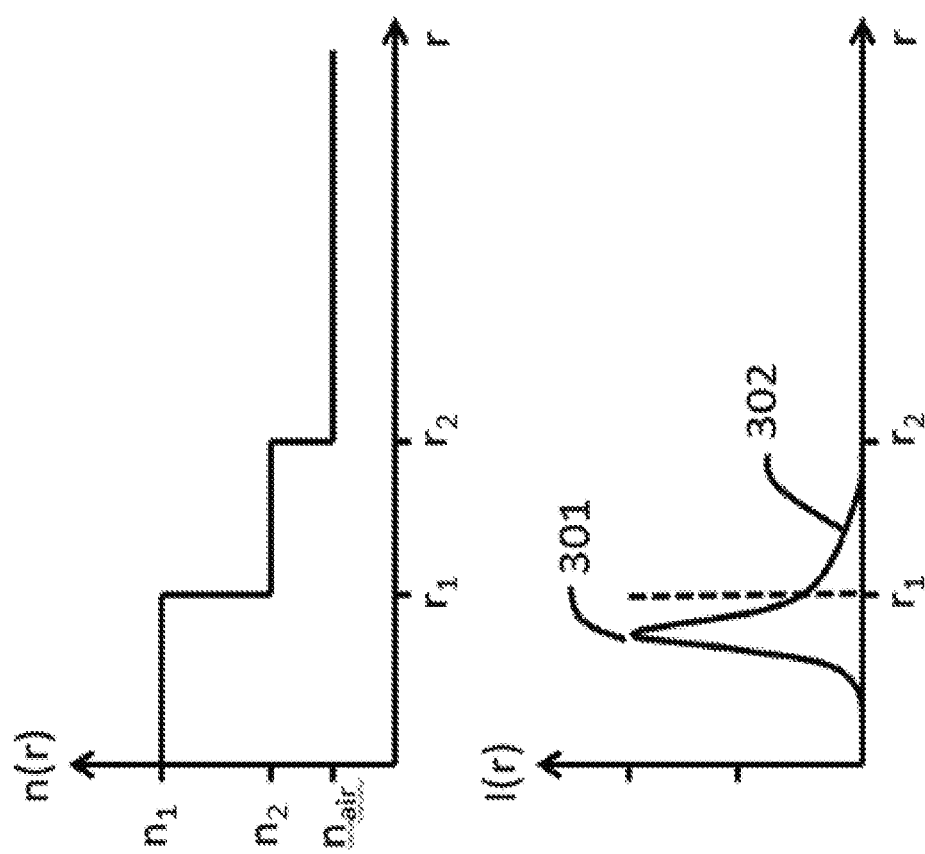
FIG. 3 illustrates plots of refractive index profile for a spherical optical cavity and the associated whispering gallery mode intensity as a function of radius.

FIG. 3 illustrates plots of refractive index profile of a spherical optical cavity and the associated whispering gallery mode intensity as a function of radius, with origin being the center of the spherical cavity. The top plot in FIG. 3 shows an example step index profile, where the core index is $n_1$ and the cladding index is $n_2$, with $n_1 > n_2$ at the operating wavelength $\lambda$ in order to maintain a guiding mode, which is depicted in FIGS. 1 and 2 as trapped circulating light. The refractive index of doped glass depends on the type of glass, wavelength, processing conditions and dopant concentration. For example, a microsphere comprising phosphate glass doped with Yb (20% by weight) and Er (0.5% by weight) has a refractive index of 1.521 at the wavelength of 1.5 micron. The cladding can be made of a lower index glass or polymer that has a low optical loss at the operating wavelength. FIG. 3 also shows an example plot of the intensity of one of the whispering gallery modes inside the cavity as a function of radius. As illustrated, most of the energy is inside the core ($r<r_1$), with a peak at 301, and some of the energy is outside the core ($r>r_1$) as evanescent wave 302. The value of $r_2$ (i.e., where the intensity of light becomes substantially zero outside of the core) depends on the refractive indices $n_1$ and $n_2$ and can be estimated by the evanescent wave penetration depth or decay length, d, given by the following:

$$d = \frac{\lambda}{4\pi\sqrt{n_1^2\sin^2\theta - n_2^2}}.$$

Here, θ is the angle of incidence of the ray at the interface and depends on the propagating mode. In some example implementations, d can range from 50 nm to 500 nm depending on the indices of refraction and mode. In general, d tends to become smaller when the ratio of $n_1$ to $n_2$ becomes larger. In some example configurations, $r_2$ can be set to be a multiple of d. For smaller $r_2$, more light will leak out of the cavity; in this scenario, the signal detected by the detectors is large and the gain may need to be increased to support the whispering gallery. For larger $r_2$, less light will leak out of the cavity, such that a more sensitive detector may be needed.

FIG. 4(a) is a schematic of an optical gyroscope configuration 400 in accordance with another example embodiment. This configuration includes a camera and a multi-layer spherical optical cavity that is supported and optically connected to an optical fiber that is connected to light source and detector. In particular, the optical cavity 401 is supported by an optical fiber 402 that is connected to a circulator 403. The circulator 403 is connected to fibers 404 and 406. A pump light source 407 is connected to the fiber 406 and provides energy to amplify the circulating light inside the sphere 401. A detector 405 is connected to fiber 404 to monitor the intensity of the whispering gallery mode 409 inside the cavity. A camera 408 is used to monitor the whispering gallery mode. The camera can be wavelength sensitive or polarization sensitive or both. Looking from the top by the camera 408 at the circulating light in the cavity 401, the mode distribution appears to be shaped like a circle. The whispering gallery mode 409 is circulating along the x-y plane and around the z-axis.

FIG. 4(b) is a rotated optical gyroscope configuration 410, illustrating the configuration of FIG. 4(a) after the gyroscope is rotated 45 degrees around the x-axis along the y-z plane to a new (rotated) coordinate system y' and z'. In the rotated configuration 410, the whispering gallery mode 409 remains the same (i.e., has the same shape, rotation, polarization, etc.) as in FIG. 4(a). However, looking at the circulating light by the camera 408 from the new orientation, the mode distribution appears to be shaped like an ellipse with its major axis directed along the direction of orientation. It should be noted that in the describing the configurations disclosed herein, the word "connected" is sometime used by the way of example and not by limitation to illustrate the arrangement of some components with respect to others. It is understood, however, that in some implementations, the various components may be connected indirectly via intervening components (e.g., support components, relay components, etc.).

Figure 5:
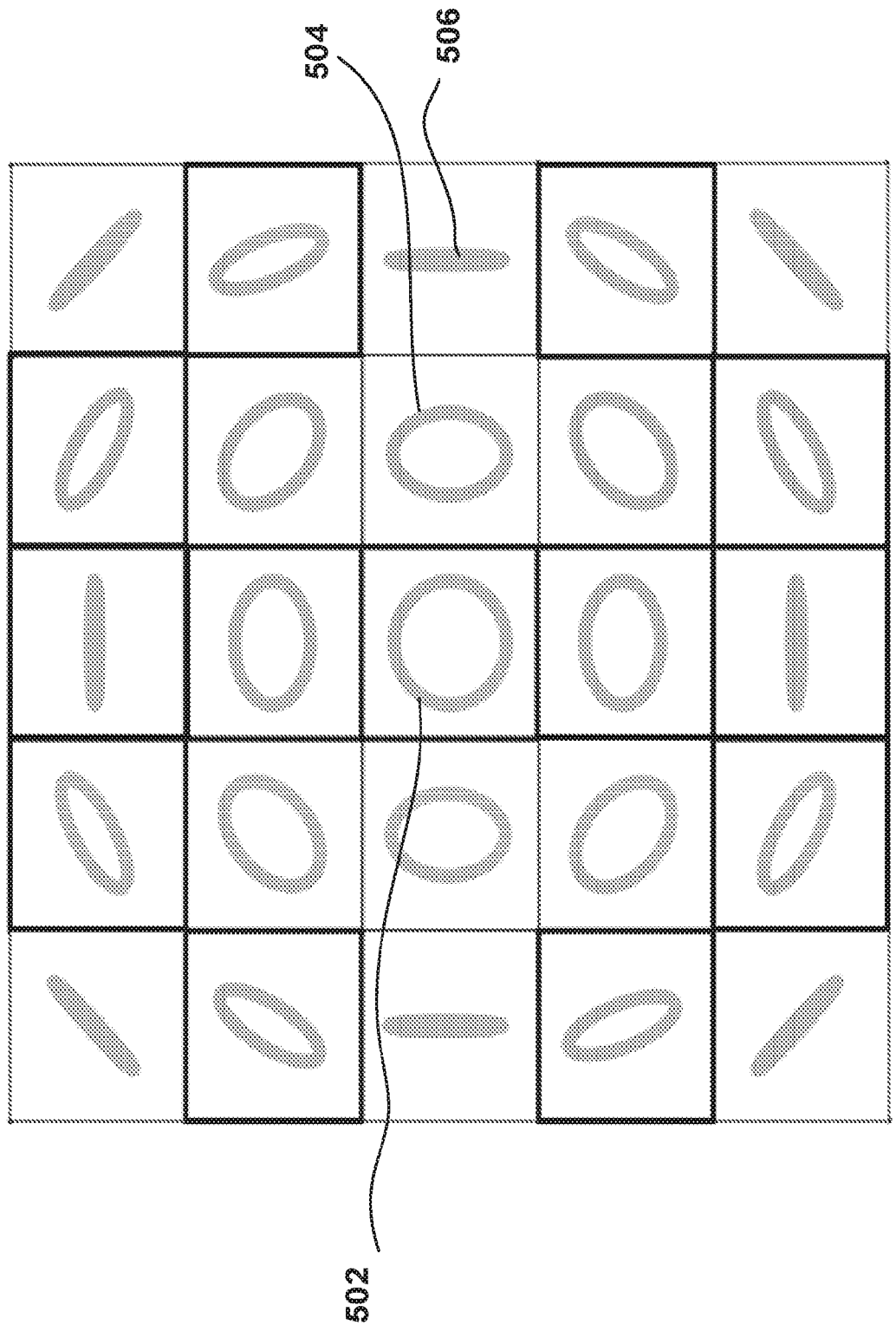
FIG. 5 illustrates different examples of the whispering gallery mode light that can be obtained by rotating the optical gyroscope of FIG. 4(a).

FIG. 5 shows 25 different example views of the whispering gallery mode at different angular orientations obtained based rotating the configuration of FIG. 4(a). The center view in FIG. 5 depicts a circle 502 illustrating the top-down view as obtained based on the configuration of FIG. 4(a). As the gyroscope is rotated around the x-axis along the y-z plane, the circle becomes an ellipse at 45 degrees 504 and a line at 90 degrees 506. Other views in FIG. 5 are obtained based on rotations around the other axis (y or z) alone, and/or in combination with rotations around the x-axis. It is evident that using the configuration of FIG. 4(a), rotations of the gyroscope in a three-dimensional space can be identified based on the images obtained by the camera. For example, the images can be mapped to corresponding orientation values in a look-up table implementation. Interpolation, extrapolation, curve fitting and other techniques can be used to estimate the orientation values if a one-to-one mapping is not available.

Figure 6:
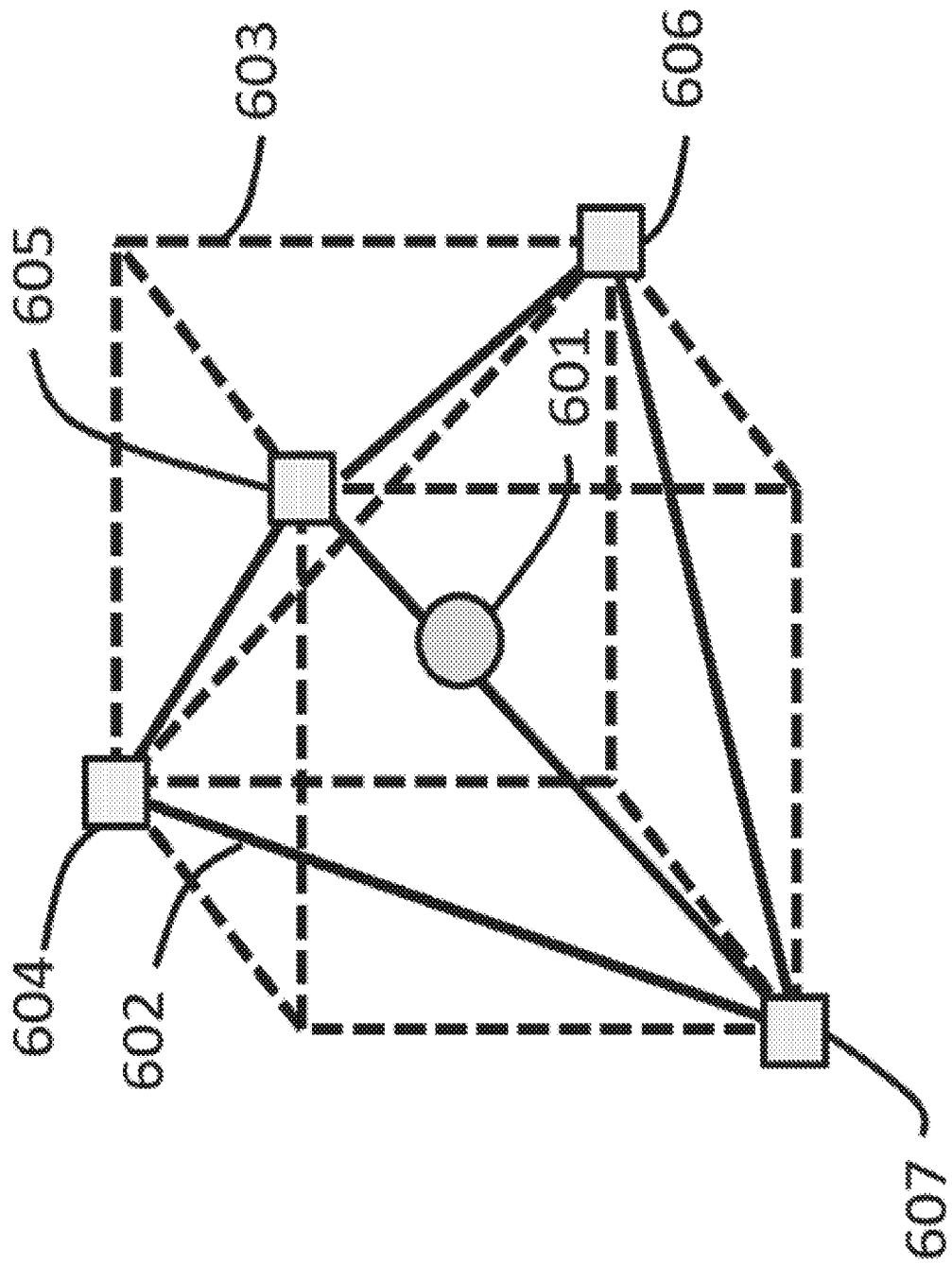
FIG. 6 illustrates another configuration of an optical gyroscope that includes four detectors positioned at corners of a tetrahedron in accordance with an example embodiment.

The position of the detector relative to the glass sphere determines the relative intensity of the measurements. In one embodiment as shown in FIG. 6, the optical gyroscope utilizes four detectors 604, 605, 606 and 607 at corners of a tetrahedron 602 surrounding the sphere 601. For example, each of the detectors can be point detectors that detect the intensity of light that is incident thereupon. Based on their relative orientations with respect to the plane of the whispering gallery mode, each detector measures a different intensity value, which collectively can be used to determine (e.g., via a table-lookup mapping or formulaic relationship) the orientation value.

Figure 7:
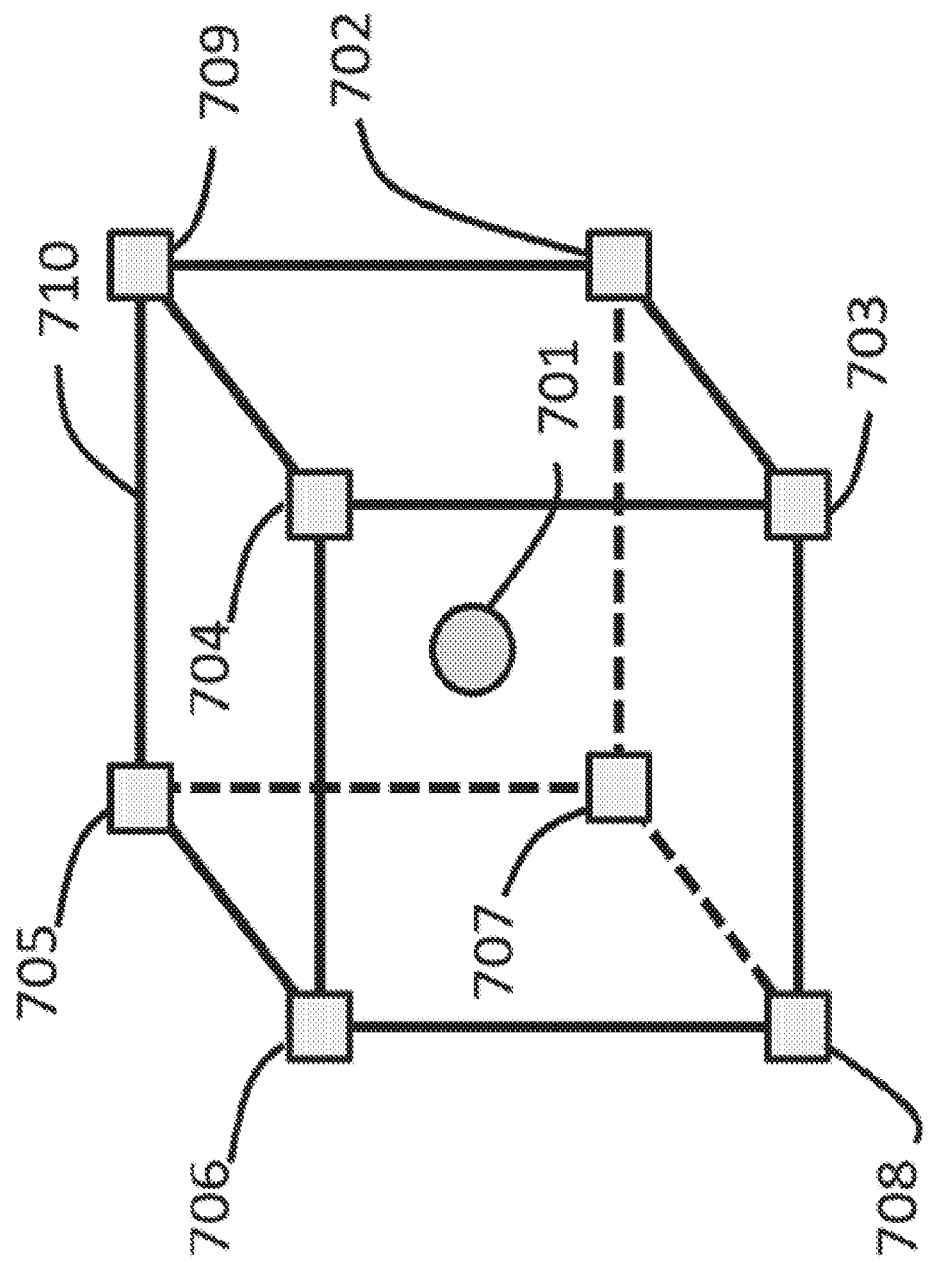
FIG. 7 illustrates another configuration of an optical gyroscope that includes eight detectors positioned at corners of a cube accordance with an example embodiment.

In another embodiment as shown in FIG. 7, the optical gyroscope utilizes eight detectors 702, 703, 704, 705, 706, 707, 708 and 709 at corners of a cube 710 surrounding the sphere 701. The number of detectors depends on the required resolution, cost and speed of gyroscope. In principle, the resolution increases with the number of the detectors along with increasing overhead cost associated with analyzing the data stream and the supporting hardware. In the configurations similar to FIGS. 6 and 7, when point intensity detectors are used, a minimum of two detectors is needed to determine the orientation.

In some embodiments, one or more detectors are polarimeters that can measure a polarization of the light. For example, the polarimeter can determine the Stokes parameters to determine the polarization. For example, the polarimeter can be a division of amplitude full-Stokes camera. The detected polarization values can be used similar to the methodology described in connection with FIGS. 2, 4(a), 4(b), 6 and 7, to either augment or to separately determine the orientation value. In some embodiments, for example, the polarized light detections are used to improve the accuracy of intensity-based or image-based detections.

Instrument Calibration

In order to get precise measurements from the optical gyroscope, the instrument must be calibrated for all operating orientations. One example calibration procedure involves initially creating the propagating mode inside the cavity. Data from the detectors are recorded at steady state at no motion and rotation. The instrument is then oriented in one direction and data from the detectors are recorded again. This is repeated for all possible (or a predetermined number of) operating orientations, and the results are stored. The calibration data set may be repeated at different temperature, pressure, and/or humidity values to account for different operating conditions. During operation, the measured data is compared with the calibration data to determine orientation of the instrument. Interpolation and extrapolation, artificial intelligence and deep learning algorithms may be used to process the raw data to generate a more accurate measurement.

The embodiments disclosed herein provide for methods and devices that measure orientation, angular velocity, angular acceleration or higher order derivatives of motion. These and other features and benefits are achieved in-part by measurements of the mode distribution and polarization state of circulating light inside a gain medium. The polarization state can include part of or the entire Stokes parameters of light. The instrument can operate as a gyroscope and has applications in navigation and direction sensing. The disclosed gyroscopes achieve some or all of the desired characteristics of an ideal gyroscope that needs to be fast, accurate, durable, insensitive to noise and environmental changes, such as temperature, pressure and humidity. In addition, the disclosed gyroscopes have a small size, weight and power requirements (SWaP).

FIG. 8 illustrates a set of operations that can be carried out to determine an orientation value using an optical gyroscope in accordance with an example embodiment. At 802, the optical gyroscope is rotated from a first position to a second position; the optical gyroscope include a spherical component configured to allow propagation of light in one or more confined modes inside the spherical component, and the spherical component includes a gain medium for enhancing a sustained confinement of light within the spherical component; the optical gyroscope also includes one or more detectors positioned outside of the spherical component. At 804, at least one characteristic of the light that is captured by the one or more detectors is determined in response to the rotation of the gyroscope. At 806, an amount of rotation of the gyroscope is determined based on the determined characteristic.

In one example embodiment, the at least one characteristic includes one or more of: (a) polarization parameters obtained by the one or more detectors, (b) intensity values obtained by the one or more detectors, or (c) one or more images of the propagating light in one or more confined modes inside the spherical component. In another example embodiment, the above noted method includes determining the amount of rotation of the gyroscope using a set of calibration data indicative of a correspondence between rotation values of the gyroscope and stored parameters associated with the characteristic.

One aspect of the disclosed embodiments relates to an optical gyroscope that includes a spherical component configured to allow propagation of light in one or more confined modes inside the spherical component, where the spherical component includes a gain medium for enhancing a sustained confinement of light within the spherical component. The optical gyroscope also includes one or more detectors positioned outside of the spherical component to detect at least one characteristic of the light, or a change thereto, in response to a rotation of the optical gyroscope.

In one example embodiment, the spherical component comprises a glass material that is uniformly doped with the gain material. In another example embodiment, the gain material comprises one of erbium, ytterbium, or neodymium. In yet another example embodiment, the optical gyroscope further includes a cladding that surrounds the spherical component, where the cladding has a refractive index that is smaller than a refractive index of the spherical component. In still another example embodiment, the cladding has one of the following geometries: a spherical, or a rectangular, or an arbitrary-shaped geometry.

According to one example embodiment, the spherical component is configured to allow light inside the spherical component to propagate in a whispering gallery mode that is confined substantially at an equator of the spherical component based on total internal reflection. In another example embodiment, the light that propagates in the one or more confined modes inside the spherical component is at a peak intensity at a radial position inside the spherical component that is closer to an outer surface of the spherical component than the center of the spherical component. In still another example embodiment, the optical gyroscope further includes a light source that is coupled to the spherical component to continually or periodically replenish the light that propagates inside the spherical component. In this example embodiment, the optical gyroscope further includes a cladding that surrounds the spherical component, wherein the light source is configured to deliver the light to the cladding that subsequently propagates to the spherical component. In another example embodiment, the light from the light source is delivered through an optical fiber to the cladding. In yet another example embodiment, the light from the light source is coupled to the cladding through evanescent waves.

In another example embodiment, one or more of the following characteristics of the propagating light inside the spherical component remains unchanged upon rotation of the optical gyroscope: (a) a rotation direction, (b) a polarization parameter, (c) an intensity value (d) a position, or (e) a shape. In one example embodiment, the propagating light inside the spherical component in the one or more confined modes provides a reference orientation for the optical gyroscope. In another example embodiment, the one or more detectors include a camera that is configured to rotate with the gyroscope and is positioned to capture images of the light that propagates inside the spherical component, wherein one or more of (a) an intensity, (b) a shape or (c) a polarization parameter of the light that is captured by the camera changes based on an amount or direction of rotation of the gyroscope. In still another example embodiment, the one or more detectors include one or more of: a polarization-sensitive camera, a point detector, a detector array or a camera.

According to another example embodiment, the one or more detectors comprise a plurality of detectors that are positioned at a corresponding plurality of positions around the spherical component. In one example embodiment, each of the plurality of detectors is positioned at a corner of a tetrahedron surrounding the spherical component. In another example embodiment, the plurality of detectors consists of 8 detectors. In yet another example embodiment, upon rotation of the optical gyroscope, an associated rotation value is determined based on detected intensities from the plurality of detectors. In still another example embodiment, upon rotation of the optical gyroscope, an associated rotation value is determined based on detected polarization parameters from the plurality of detectors. In another example embodiment, upon rotation of the optical gyroscope, an associated rotation value is determined based on one or more detected images of the light that propagates inside the spherical component.

In one example embodiment, a rotation value of the optical gyroscope is determined using one or more of curve fitting, interpolation, extrapolation or machine learning processing conducted based on calibration information. In another example embodiment, the calibration information includes one or more of (a) stored images of light circulation patterns, (b) stored polarization parameters, (c) stored intensity values, or (d) formulaic relationships of the calibration information.

Another aspect of the disclosed embodiments relates to an optical gyroscope that includes a spherical component configured to allow propagation of light in a confined mode inside the spherical component, where the spherical component includes a gain medium for enhancing a sustained confinement of light within the spherical component. The optical gyroscope further includes one or more detectors positioned outside of the spherical component to detect at least one of the following in response to a rotation of the gyroscope: (a) differing intensity values detected at two or more of the detectors that are positioned spatially apart around the spherical component; (b) a change in a polarization parameter of the light that is detected by the one or more detectors, or (c) a change in a detected geometrical profile of the light captured by the one or more detectors that includes a change from any one of a circular, an elliptical or a linear profile to another one of the circular, elliptical or the linear profile.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. An optical gyroscope, comprising:
a spherical component configured to allow propagation of light in one or more confined modes inside the spherical component, the spherical component comprising a gain medium for enhancing a sustained confinement of light within the spherical component; and
one or more detectors positioned outside of the spherical component to detect at least one characteristic of the light, or a change thereto, in response to a rotation of the optical gyroscope,
wherein the one or more detectors include a camera that is configured to rotate with the gyroscope and is positioned to capture images of the light that propagates inside the spherical component, and wherein one or more of a shape or a polarization parameter of the light corresponding to the images that are captured by the camera changes based on an amount or direction of rotation of the gyroscope.

2. The optical gyroscope of claim 1, wherein the spherical component comprises a glass material that is uniformly doped with the gain material.

3. The optical gyroscope of claim 2, wherein the gain material comprises one of erbium, ytterbium, or neodymium.

4. The optical gyroscope of claim 1, further comprising a cladding that surrounds the spherical component, the cladding having a refractive index that is smaller than a refractive index of the spherical component.

5. The optical gyroscope of claim 4, wherein the cladding has one of the following geometries: a spherical, or a rectangular geometry.

6. The optical gyroscope of claim 1, wherein the spherical component is configured to allow light inside the spherical component to propagate in a whispering gallery mode that is confined substantially at an equator of the spherical component based on total internal reflection.

7. The optical gyroscope of claim 1, wherein the light that propagates in the one or more confined modes inside the spherical component is at a peak intensity at a radial position inside the spherical component that is closer to an outer surface of the spherical component than the center of the spherical component.

8. The optical gyroscope of claim 1, further including a light source that is coupled to the spherical component to continually or periodically replenish the light that propagates inside the spherical component.

9. The optical gyroscope of claim 8, further comprising a cladding that surrounds the spherical component, wherein the light source is configured to deliver the light to the cladding that subsequently propagates to the spherical component.

10. The optical gyroscope of claim 9, wherein the light from the light source is delivered through an optical fiber to the cladding.

11. The optical gyroscope of claim 9, wherein the light from the light source is coupled to the cladding through evanescent waves.

12. The optical gyroscope of claim 1, wherein one or more of the following characteristics of the propagating light inside the spherical component remains unchanged upon rotation of the optical gyroscope: (a) a rotation direction, (b) a polarization parameter, (c) an intensity value (d) a position, or (e) a shape.

13. The optical gyroscope of claim 1, wherein the propagating light inside the spherical component in the one or more confined modes provides a reference orientation for the optical gyroscope.

14. The optical gyroscope of claim 1, wherein the one or more detectors include one or more of: a polarization-sensitive camera, a point detector, a detector array or a camera.

15. The optical gyroscope of claim 1, wherein the one or more detectors comprise a plurality of detectors that are positioned at a corresponding plurality of positions around the spherical component.

16. The optical gyroscope of claim 15, wherein each of the plurality of detectors is positioned at a corner of a tetrahedron surrounding the spherical component.

17. The optical gyroscope of claim 15, wherein the plurality of detectors consists of 8 detectors.

18. The optical gyroscope of claim 15, wherein, upon rotation of the optical gyroscope, an associated rotation value is determined based on detected intensities from the plurality of detectors.

19. The optical gyroscope of claim 16, wherein, upon rotation of the optical gyroscope, an associated rotation value is determined based on detected polarization parameters from the plurality of detectors.

20. The optical gyroscope of claim 1, wherein, upon rotation of the optical gyroscope, an associated rotation value is determined based on one or more detected images of the light that propagates inside the spherical component.

21. The optical gyroscope of claim 1, wherein a rotation value of the optical gyroscope is determined using one or more of curve fitting, interpolation, extrapolation or machine learning processing conducted based on calibration information.

22. The optical gyroscope of claim 21, wherein the calibration information includes one or more of (a) stored images of light circulation patterns, (b) stored polarization parameters, (c) stored intensity values, or (d) formulaic relationships of the calibration information.

23. A method for determining an orientation value using an optical gyroscope, comprising:
    rotating the optical gyroscope from a first position to a second position, the optical gyroscope comprising:
        a spherical component configured to allow propagation of light in one or more confined modes inside the spherical component, the spherical component comprising a gain medium for enhancing a sustained confinement of light within the spherical component, and
        one or more detectors positioned outside of the spherical component;
    determining at least one characteristic of the light that is captured by the one or more detectors in response to the rotation of the gyroscope; and
    determining an amount of rotation of the gyroscope based on the determined characteristic, wherein determining the amount of rotation of the gyroscope includes using a set of calibration data indicative of a correspondence between rotation values of the gyroscope and stored parameters associated with the characteristic.

24. The method of claim 23, wherein the at least one characteristic includes one or more of:
    (a) polarization parameters obtained by the one or more detectors, or
    (b) one or more images of the propagating light in one or more confined modes inside the spherical component.

25. The method of claim 24, wherein the at least one characteristic includes: intensity values obtained by the one or more detectors.

26. An optical gyroscope, comprising:
    a spherical component configured to allow propagation of light in a confined mode inside the spherical component, the spherical component comprising a gain medium for enhancing a sustained confinement of light within the spherical component; and
    one or more detectors positioned outside of the spherical component to detect at least one of the following in response to a rotation of the gyroscope:
    (a) a change in a polarization parameter of the light that is detected by the one or more detectors, or
    (b) a change in a detected geometrical profile of the light captured by the one or more detectors that includes a change from any one of a circular, an elliptical or a linear profile to another one of the circular, elliptical or the linear profile.

27. The optical gyroscope of claim 26, wherein the one or more detectors positioned outside of the spherical component are configured to further detect, in response to a rotation of the gyroscope, differing intensity values detected at two or more of the detectors that are positioned spatially apart around the spherical component.

* * * * *